April 22, 1969 R. F. ZITKO ET AL 3,439,479
ROW CROP HARVESTER
Filed July 18, 1966 Sheet 1 of 3

Inventors:
Ronald F. Zitko
Carmen S. Phillips
John J. Kowalik
Atty.

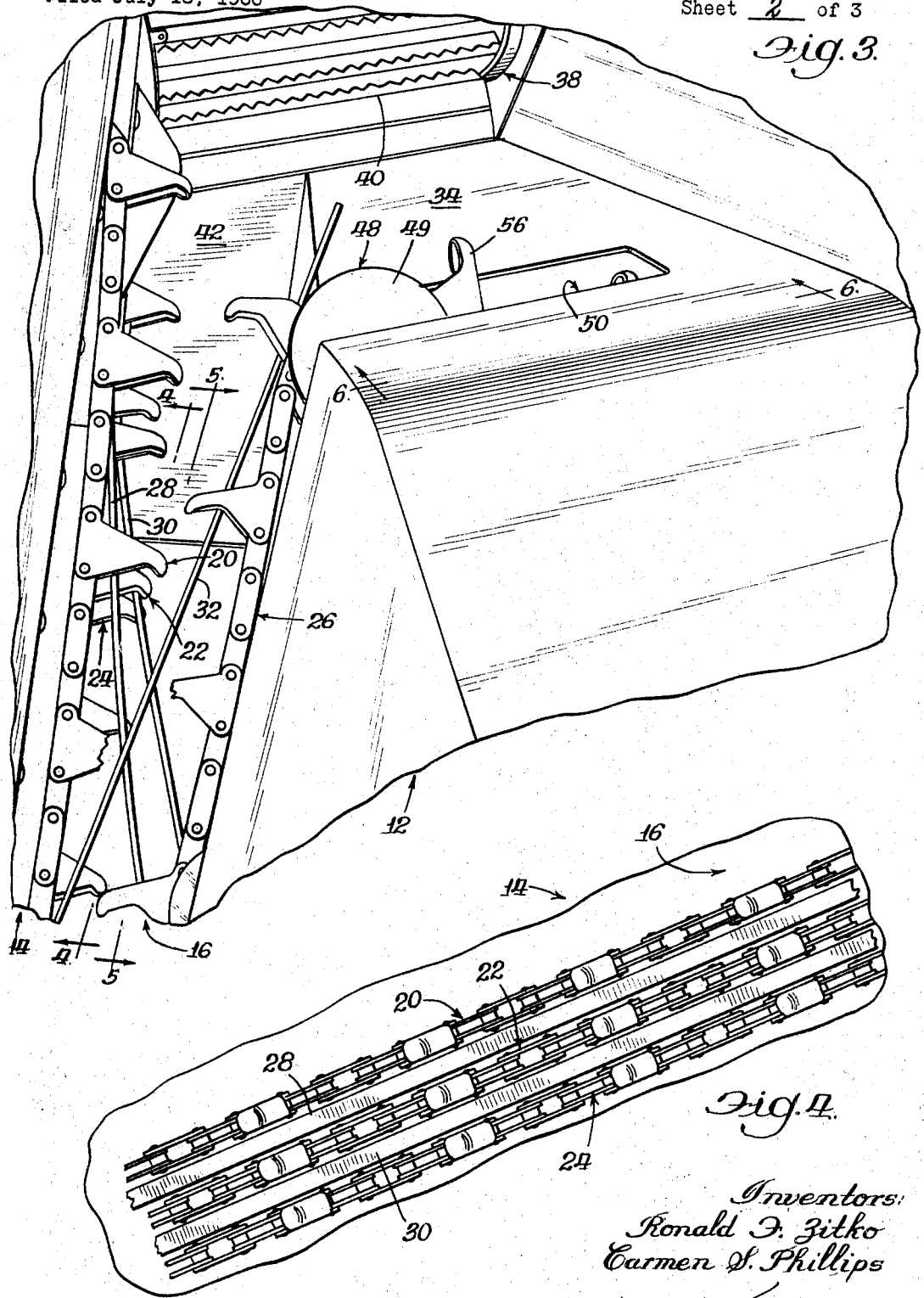

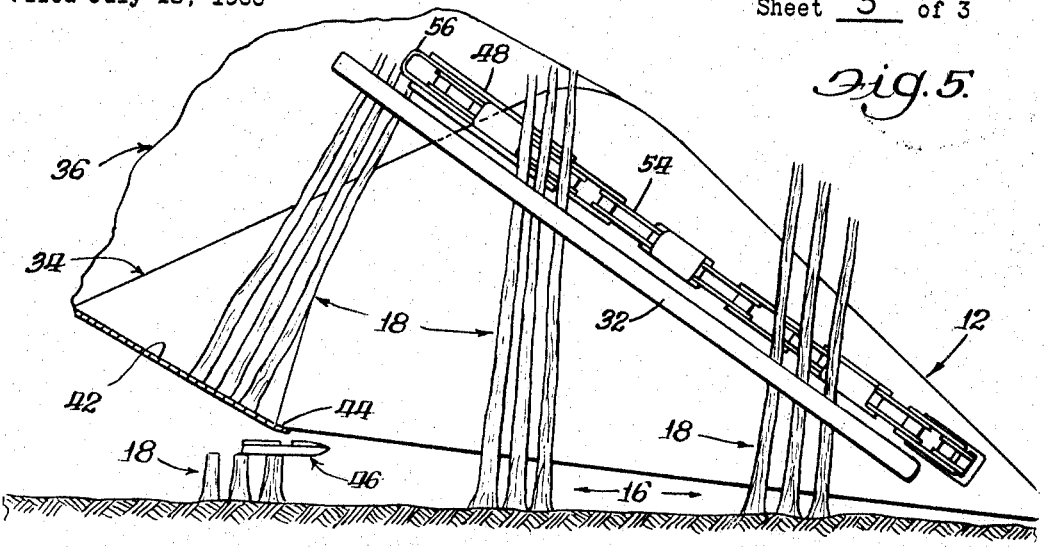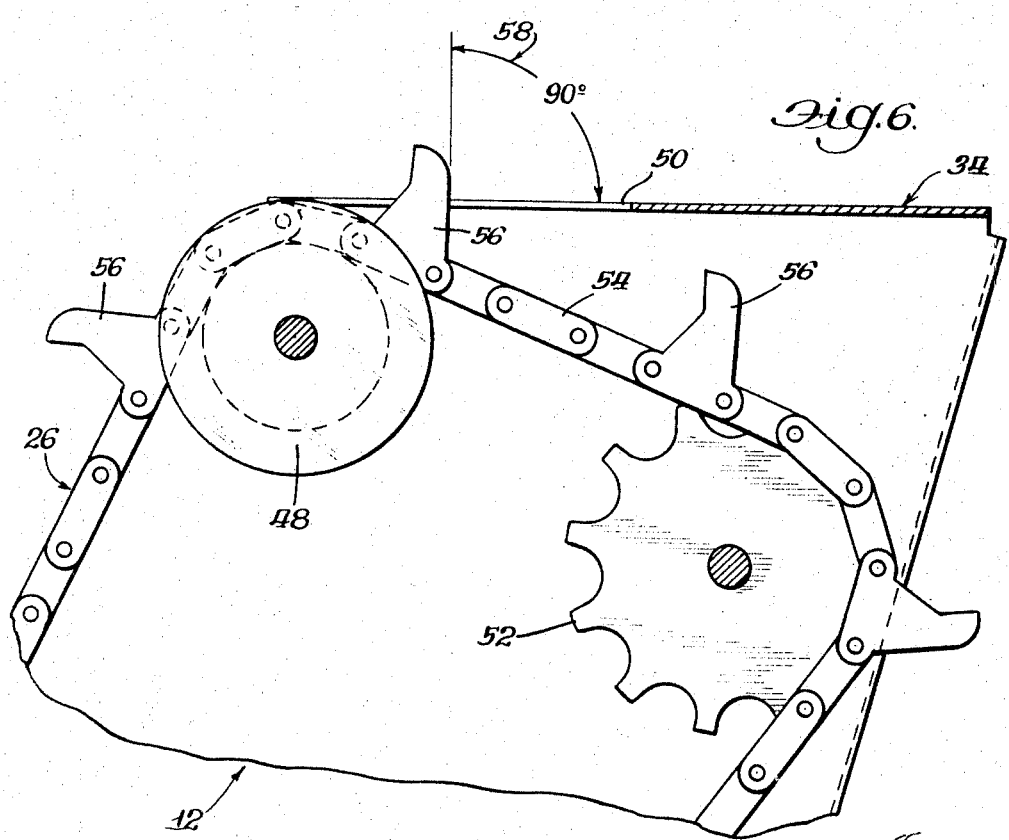

United States Patent Office
3,439,479
Patented Apr. 22, 1969

---

3,439,479
ROW CROP HARVESTER
Ronald F. Zitko and Carmen S. Phillips, Downers Grove, Ill., assignors to International Harvester Company, Chicago, Ill., a corporation of Delaware
Filed July 18, 1966, Ser. No. 565,870
Int. Cl. A01d *45/02*
U.S. Cl. 56—16          6 Claims The present invention relates to a row crop harvester.
The invention relates to a forage harvester for harvesting crops having stalks, this type of harvester in general being known, and adapted for cutting the plants and carrying them through the machine to another instrumentality such as a cutter or chopper. Such a harvester includes an area where the stalks, after being cut, gather in their progress through the machine, but due to the continuous accumulation of new stalks therein the total mass of the stalks heretofore has not been well distributed in this area, either longitudinally or transversely, with the result that their depth was correspondingly uneven and erratic, resulting in corresponding inefficiency in the function of the instrumentality to which the stalks are delivered (such as the cutter or chopper) after being cut.

A broad object of the present invention is to provide a row crop harvester adapted for cutting plant stalks and including an arrangement for spreading the stalks after being cut into a highly uniform mass and delivering them to the posterior positioned instrumentality.

A more specilc object is to provide a row crop harvester of the foregoing general character having means for cutting stalks and including a table, and incorporating means for transmitting the stalks, after being cut, onto the table and distributing hem ino a substantially uniform mass transversely across the table for delivery to the posterior instrumentality.

Figure 1:
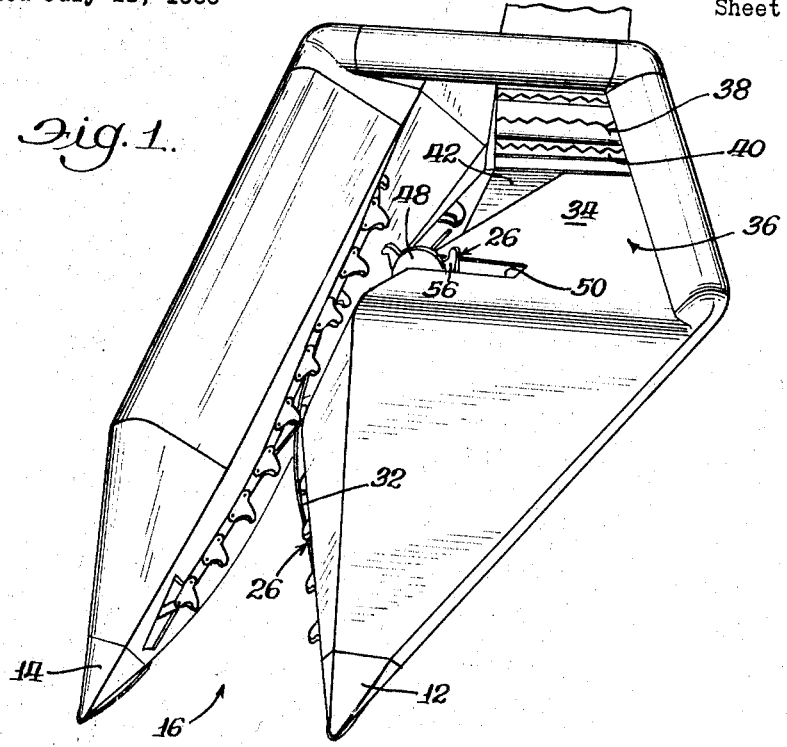
Figure 2:
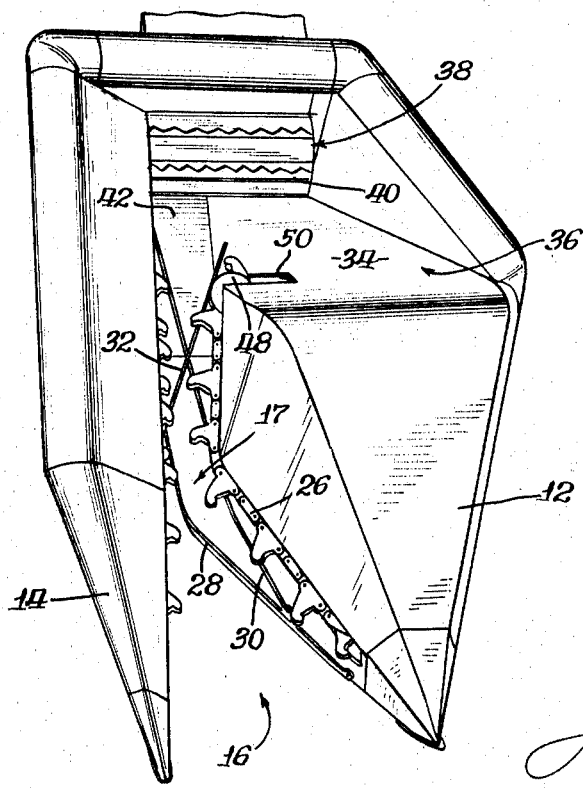

Other objects and advantages of the invention will appear from the following detailed description taken in conjunction with the accompanying drawings in which:
FIGURE 1 is a perspective view of a harvester embodying the features of the present invention;
FIGURE 2 is a perspective view similar to FIGURE 1, but from a different angle;
FIGURE 3 is a perspective view, on a larger scale, showing only a portion of the harvester;
FIGURE 4 is a view taken substantially at line 4—4 of FIGURE 3 showing one side of the gathering passage in side elevation;
FIGURE 5 is a view taken at line 5—5 of FIGURE 3 showing the other side of the gathering passage, in side elevation; and
FIGURE 6 is a semidiagrammatic view taken at line 6—6 of FIGURE 3 showing certain elements isolated from the remainder of the harvester.

Referring now in detail to the accompanying drawings, FIGURE 1 shows the row crop forage harvester 10 to which the present invention is applied. Such harvesters in general are known, and so much thereof as is known will bereferred to only generally, with detailed description of the features of the present invention. The harvester includes gathering dividers 12 and 14, referred to as the inner and outer gathering dividers respectively, for convenience. These gathering dividers define a gathering passage 16 therebetween which leads rearwardly to a constriction 17 and continues to a position adjacent the rear of the machine where it terminates. A plurality of gathering chains are provided on the sides of the gathering passage for conveying and guiding the plant stalks, such as corn stalks indicated at 18, in their movement through the passage 16. These chains include at least one such chain on each of the opposite sides of the passage 16, and in the present instance include three chains 20, 22 and 24 on the outer side and at least one such chain 26 on the inner side. These chains may be of any suitable and desired type and intermesh if desired in at least a portion of the passage. The chain 26 is provided with a special mounting in its upper inner end as will be referred to again hereinbelow.

Pressure straps 28 and 30 are secured at their forward ends to the inner gathering divider 12 with their rear ends free, and extend rearwardly in the direction of movement of the chains, being spaced apart in the direction of the spacing of the chains 20, 22, 24 and are disposed preferably between respective adjacent ones of the chains. These two pressure straps are positioned toward the bottom of the passage, i.e., where they engage the plant stalks closely adjacent the lower ends thereof. Another pressure strap 32 is provided, secured at its front end to the outer gathering divider 14 and extending rearwardly where its rear end is free. This arrangement of the pressure straps is included as an important feature of the present invention. These pressure straps act generally oppositely, the two lower ones, 28 and 30, biasing the lower ends of the plant stalks outwardly against the gathering divider 14 while the top one, 32 biases the stalks at a position above the bottom ends thereof, inwardly against the inner gathering divider 12. These pressure straps are of known kind, being self-biased to the positions shown in FIGURE 2 but yielding therefrom in response to plant stalks passing through the passage, and they then bias the stalks in corresponding directions, in the present instance in a tilting direction as will be referred to again hereinbelow.

The gathering divider 12 at the top merges into a table 34 extending rearwardly and preferably declining rearwardly at an angle on the order of 15°. This table is closely adjacent to, and to one side of, the gathering passage 16 and is adapted to receive the plant stalks in the harvesting operation as described hereinbelow. This table forms the lower limit of a channel, or passage, or area 36 through which the plant stalks after being cut pass to to the next operation or instrumentality, which may be any of a number of devices such as a cutter or chopper. Such a device is indicated generally at 38 and in the present instance is represented by components such as rolls at 40 at the rear end of the channel 36 and extending threacross, these rolls receiving the plant stalks from the channel. The specific instrumentality 38 utilized does not enter into the present invention, but whatever the instrumentality is that is so used, more effective operation is achieved by having the instrumentality extend fully across the channel, and a principal feature of the present invention is to distribute the plant stalks fully throughout the channel transversely, to achieve that greater efficiency.

At the rear end of the gathering passage 16 is a deflector 42, which leads from a lower position indicated at 44 (FIGURE 5) disposed above the usual cutter means indicated generally and semidiagrammatically at 46 at the rear end of the gathering passage 16, and inclines upwardly rearwardly where it merges with the table 34 adjacent the rear end of the latter. As the plant stalks are cut by the cutter means 46, their butt ends engage the deflector 42 and are deflected upwardly thereby, as well as by the chains 20, 22, 24, the mass of stalks thus being moved into the channel 36 in butt-end-rear position and moved into the successive instrumentality 34 in that direction.

The chain 26 on the inner gathering divider 12 at its inner and upper end provides a distributor instrumentality which is another important feature of the present invention, said chain being trained over an idler sprocket 48 having a clearing shield 49 (FIGURE 3) exposed through a slot 50 in the table 34 and extending into the gathering passage 16 and above the table. The chain is trained over a driving sphocket 52 disposed below the table forming with a first sprocket 48, a run 54 of the chain inclined downwardly away from the plant row at an angle to the table 34.

The chain 26 is provided with lugs 56 (as are the other chains), inclined at an angle to the straight run of the chain such that when the lugs are carried on the run 54 they are disposed substantially at a right angle 58 to the line of intersection of the table 34 and the plane in which the run 54 moves. This angle achieves a self-shedding function, clearing the plant stalks from the lugs, while at the same time performing a spreading function on the stalks, distributing them transversely across the table. Preferably the outer ends of the lugs are rounded as shown, as is customary.

In the harvesting operation as the plant stalks move through the passage 16 they are confined and controlled by the chains 20, 22, 24, 26 and the pressure straps 28, 30, 32. After the stalks are cut, the butt ends engage the deflector plate 42 and are deflected upwardly as referred to, which moves them into a position approaching the horizontal. The flow of the mass of plant stalks through the passage 16 forces those at the rear portion upwardly. In conjunction with the function of the deflector 42, the pressure straps perform a constant biasing effect that results in a generally tilting or twisting operation, i.e., the lower two pressure straps 28, 30, bias the lower ends of the stalks outwardly against the outer gathering divider 14, while the upper pressure strap 42, engaging the stalks at an upper position, biases the upper portions inwardly against the gathering divider 12, with the result that the stalks are tilted and twisted, as indicated, and the upper ends of the stalks forced inwardly over the inner gathering divider 12 and actually "flipped" onto the table 34. The chains and straps are constantly active, performing a dynamic movement of the stalks onto the table, and the straps perform an automatic evening effect.

The gathering chain 26, in its function in distributing the plant stalks over the table, as just referred to, continues its contact engagement with the plant stalks beyond the passage 16, i.e., it continues to engage them in the passage of the lugs over the sprocket 48 and across the table. This engagement continues until the lugs recede from above the table through the slot 50. The plant stalks on top of the table accumulate or "grow" into a mass that extends entirely across the table, each new increment being fed transversely into the mass of the stalks theretofore on the table with the result that the plant stalks are coninuously forced and urged across the table throughout the transverse width thereof.

The upper pressure strap 32 and the gathering chain 26 cooperate to perform a unique spreading function on the stalks. The pressure strap being resilient produces a constant force on the stalks, regardless of the non-uniform flow thereof; the stalks arrive in bunches and groups, rather than uniformly singly, and in the case of large bunches the pressure strap may yield entirely across the passage, but will nevertheless continue to produce a biasing effect on the stalks. The gathering chain produces a positive pushing action, but the lugs thereon are not of course synchronized with the bunches of stalks, and in the intervals between successive lugs in which the lugs are not directly active in pushing the stalks, the pressure strap continues to perform its biasing function to move the new increments of stalks into position for engagement by the next lug on the chain.

While we have disclosed herein a preferred form of the invention, it will be understood that changes may be made therein within the spirit and scope of the appended claims.

We claim:
1. A row crop forage harvester adapted for harvesting plants having stalks, comprising a pair of gathering dividers defining a gathering passage therebetween, cutting means adjacent the rear end of the passage, the harvester having a generally horizontal area of substantial width adjacent the passage for receiving the plant stalks thereupon, after being cut, in position adjacent the horizontal for further movement of the stalks rearwardly, common means on at least one of the gathering dividers on a side of the passage for carrying the stalks rearwardly and for actively spreading the cut stalks laterally throughout said area and comprising a chain having a run alongside said passage and including fingers on the chain projecting into said passage for engagement with the stalks of the crop for moving the crop within the passage rearwardly, said generally horizontal area having a slot therein, said chain having a transverse run extending through said slot and having the fingers thereon projecting above said area.

2. The invention set out in claim 1 wherein said transverse run of the chain extend above the area for only a portion of the width thereof and move downwardly through said slot therein.

3. The invention set out in claim 2 wherein said transverse run of the chain is inclined downwardly as it moves through the area, and said fingers being in the form of lugs disposed at such angle that when in said transverse run their leading edges are disposed substantially at a right angle to the line of intersection of the area and the plane of movement of the transverse run.

4. The invention set out in claim 1 and biasing means engageable with the crops, and said biasing means being constituted by resilient pressure straps yieldingly biasing the stalks at the upper portions against one side of the passage, and yieldingly biasing the lower ends of the stalks in the opposite direction.

5. The invention set out in claim 4 wherein the harvester includes gathering means in the gathering passage constituted by chains on opposite sides of the gathering passage, and the pressure straps being vertically spaced and having front ends secured to the gathering dividers and having free rear ends, the pressure straps including at least one secured to each gathering divider and having its rear free end self-biased toward the opposite gathering divider.

6. The invention set out in claim 4 wherein a deflector is provided adjacent the rear end of the gathering passage adapted for engagement by the butt ends of the stalks and operative thereby for deflecting those ends of the stalks upwardly to move the stalks toward horizontal, and operative in conjunction with the biasing means and transverse run of the chain for spreading the stalks after being cut across the table.

References Cited

UNITED STATES PATENTS

| 2,442,524 | 6/1948 | Van Sickle | 56—16 |
| 2,456,404 | 12/1948 | Good | 56—98 |
| 2,651,162 | 9/1953 | Whisler | 56—16 X |
| 2,981,045 | 4/1961 | Blanshine et al. | 56—119 X |

ANTONIO F. GUIDA, *Primary Examiner.*

U.S. Cl. X.R.

56—98